Patented Dec. 11, 1934

1,983,871

UNITED STATES PATENT OFFICE 1,983,871

METHOD OF LAMINATING

Ulrich Ostwald, Wiesbaden-Biebrich, Germany, assignor to Du Pont Cellophane Company, Inc., New York, N. Y., a corporation of Delaware No Drawing. Application June 30, 1931, Serial No. 548,027. In Germany July 19, 1930

12 Claims. (Cl. 154—40)

This invention relates to the art of laminating and, more particularly, to a method of laminating sheets or films of regenerated cellulose to other materials.

In my copending application Ser. No. 518,422, filed February 26, 1931, there is disclosed a process of laminating ordinary, coated or moistureproof sheets or films of regenerated cellulose to various bases to produce laminated materials and which comprises utilizing a shrunken sheet or film of regenerated cellulose which is also preferably substantially free from hygroscopically combined water.

When the base to which the sheet or film of regenerated cellulose is to be secured is decorated, such as by being printed, lacquered or otherwise similarly treated, firm adhesion between the contacting surfaces of the two materials cannot be secured. This is due to the fact that the compositions employed in printing or lacquering resist gripping by the adhesives with the result that at these places the materials do not sufficiently adhere to each other. This is a very serious matter. It cannot be overcome by merely adding a greater quantity of the solvent to the adhesive used, since such a procedure would result in the formation of bubbles on the printed or lacquered areas and in many cases the colors or the ink would run.

I have now found that, if the printed or lacquered base to which the sheet or film of regenerated cellulose is to be laminated is subjected to a preliminary treatment, whereby chiefly the composition constituting the printed or lacquered areas are modified, as by being softened, firm adhesion throughout substantially the entire areas of the surfaces of the materials in contiguous relationship may be secured.

It is, therefore, an object of this invention to provide a method of laminating decorated bases preferably to shrunken sheets or films of regenerated cellulose, which comprises first rendering the base, especially the decorated portions thereof, receptive and sensitive to adhesives, as by softening with a solvent, and then subsequently adhesively securing the two materials together.

Other objects will appear from the following description and appended claims.

In accordance with the principles of this invention, an uncoated, coated or moistureproof sheet or film of regenerated cellulose, preferably preshrunk as described in my copending application above referred to, is laminated to a base which is decorated. The term "decorated" employed throughout this specification is intended to cover indicia of all kinds, ornamental configurations and designs, produced in any manner, as well as lacquered surfaces or areas. To secure firm adhesion between the contacting surfaces of the united materials, the base is, prior to the laminating operation, treated so that it is rendered sensitive to the adhesive. Subsequently, the two materials are secured through the medium of any suitable, and preferably non-aqueous, adhesive, such as, for example, those set forth in my copending application referred to above.

The preliminary treatment of the decorated base, in the preferred embodiment of the invention, contemplates modifying the decorated areas so that they will firmly adhere to the adhesive. This is accomplished by softening the ink of the decorated areas, as by applying organic solvents, such as methyl alcohol, ethyl alcohol and benzol, to the base and particularly the decorated portions thereof.

According to this invention, the solvent is preferably applied in a dispersed form to the surface of the base bearing the decoration. In one form of the process, the decorated base may be conducted over solvents maintained at boiling temperatures, whereby the solvent vapors are caused to contact with and thereby soften the ink of the decorated areas. As an alternative, solvent vapors may be blown on the decorated surface of the base. In another embodiment, the solvent may be sprayed, such as by an atomizer, on to the decorated surface of the base. In many cases it has been found advantageous to add a small quantity of adhesive to the solvent which is sprayed. The adhesive added to the solvent may be of similar composition to that employed in the final laminating operation.

After the base, especially the decorated portions thereof, has been preliminarily treated as above described, an adhesive is applied to either or both of the contiguous surfaces of the two materials to be united and the materials united in the well-known manner.

The process herein described results in a laminated product in which the contiguous surfaces of the laminae are adhesively secured throughout substantially all points thereof. By virtue of the fact that the decorated areas have been modified so that they are receptive and sensitive to adhesives, they will not resist anchorage to the adhesive. On the contrary, they will firmly grip and adhere thereto.

Since it is obvious that various changes may be made in the above description without departing from the nature and spirit thereof, this invention is not restricted thereto except as set forth in the appended claims.

I claim:

1. A process of laminating decorated bases to preshrunk sheets or films of regenerated cellulose which comprises rendering the decorations on the base receptive and sensitive to an adhesive, applying an adhesive to at least one of the surfaces to be disposed in contiguous relationship, and subsequently securing the two materials together.

2. A process of laminating decorated bases to preshrunk sheets or films of regenerated cellulose which comprises softening the decorations on the base, applying an adhesive to at least one of the materials to be united, and securing the two materials together.

3. A process of laminating decorated bases to preshrunk sheets or films of regenerated cellulose which comprises treating the decorated surface of the base with a solvent in a dispersed condition whereby the decorations are rendered receptive and sensitive to an adhesive, applying an adhesive to at least one of the materials to be united, and securing the two materials together.

4. A process of laminating decorated bases to preshrunk sheets or films of regenerated cellulose which comprises spraying the decorated surface of the base with a finely dispersed solvent whereby the decorations are rendered receptive and sensitive to an adhesive, applying an adhesive to at least one of the materials to be united, and securing the two materials together.

5. A process of laminating decorated bases to preshrunk sheets or films of regenerated cellulose which comprises treating the decorated surface of the base with solvent vapors whereby the decorations are rendered receptive and sensitive to an adhesive, applying an adhesive to at least one of the materials to be united, and securing the two materials together.

6. A process of laminating decorated bases to preshrunk sheets or films of regenerated cellulose which comprises spraying a solvent containing an adhesive onto the decorated surface of the base whereby the decorations are rendered receptive and sensitive to an adhesive, applying an adhesive to one of the materials to be united, and securing the two materials together.

7. A process of laminating decorated bases to preshrunk sheets or films of regenerated cellulose which comprises rendering the decorations on the base receptive and sensitive to an adhesive, applying a non-aqueous adhesive to at least one of the surfaces to be disposed in contiguous relationship, and subsequently securing the two materials together.

8. A process of laminating decorated bases to preshrunk sheets or films of regenerated cellulose which comprises softening the decorations on the base, applying a non-aqueous adhesive to at least one of the materials to be united, and securing the two materials together.

9. A process of laminating decorated bases to preshrunk sheets or films of regenerated cellulose which comprises treating the decorated surface of the base with a solvent in a dispersed condition whereby the decorations are rendered receptive and sensitive to an adhesive, applying a non-aqueous adhesive to at least one of the materials to be united, and securing the two materials together.

10. A process of laminating decorated bases to preshrunk sheets or films of regenerated cellulose which comprises spraying the decorated surface of the base with a finely dispersed solvent whereby the decorations are rendered receptive and sensitive to an adhesive, applying a non-aqueous adhesive to at least one of the materials to be united, and securing the two materials together.

11. A process of laminating decorated bases to preshrunk sheets or films of regenerated cellulose which comprises treating the decorated surface of the base with solvent vapors whereby the decorations are rendered receptive and sensitive to an adhesive, applying a non-aqueous adhesive to at least one of the materials to be united, and securing the two materials together.

12. A process of laminating decorated bases to preshrunk sheets or films of regenerated cellulose which comprises spraying a solvent containing an adhesive onto the decorated surface of the base whereby the decorations are rendered receptive and sensitive to an adhesive, applying a non-aqueous adhesive to one of the materials to be united, and securing the two materials together.

ULRICH OSTWALD.